United States Patent
Petrash et al.

(10) Patent No.: US 6,290,231 B1
(45) Date of Patent: Sep. 18, 2001

(54) DIVERTER FLOW LINE SEAL

(75) Inventors: Donald R. Petrash, Highlands; Richard W. Slyker, Houston, both of TX (US)

(73) Assignee: Abb Vetco Gray, Inc., Houston, TX (US)

( * ) Notice: Subject to any disclaimer, the term of this patent is extended or adjusted under 35 U.S.C. 154(b) by 0 days.

(21) Appl. No.: 09/249,989

(22) Filed: Feb. 9, 1999

Related U.S. Application Data

(63) Continuation of application No. 08/898,948, filed on Jul. 23, 1997, now Pat. No. 5,890,535.

(51) Int. Cl.⁷ ............................................. E21B 33/06
(52) U.S. Cl. ........................ 277/324; 277/331; 277/342; 277/624; 277/644
(58) Field of Search ....................... 277/324, 327, 277/331, 340, 342, 572, 575, 603, 624, 626, 627, 647, 648, 644, 641

(56) References Cited

U.S. PATENT DOCUMENTS

| | | | | |
|---|---|---|---|---|
| 2,548,412 | * | 4/1951 | Walker | 277/324 |
| 2,843,349 | * | 7/1958 | Meyer | 277/324 |
| 3,923,133 | * | 12/1975 | Chivari | 192/85 R |
| 4,174,112 | * | 11/1979 | Carrens | 277/336 |
| 4,358,085 | * | 11/1982 | Regan et al. | 251/1 B |
| 4,718,495 | * | 1/1988 | Lubitz et al. | 166/387 |
| 4,720,113 | * | 1/1988 | Hertz, Jr. | 277/342 |
| 5,094,492 | * | 3/1992 | Levivier | 285/104 |

* cited by examiner

Primary Examiner—Anthony Knight
Assistant Examiner—Alison K. Pickard
(74) Attorney, Agent, or Firm—Bracewell & Patterson, L.L.P.

(57) ABSTRACT

A diverter body having an upper portion, a central portion and a lower portion is secured to the upper end of a riser and lands in a housing. The central portion has lateral flow openings that axially align with a lateral flowline outlet in the housing. A pair of identical gallery seals locate above and below the lateral flowline outlet. The upper gallery seal is located between the upper portion, the central portion and the housing. The upper gallery seal has upper and lower metal rings and a central elastomer sandwiched therebetween. An outer diameter of the elastomer seals against the housing bore. The rings are symmetric and are mated to the elastomer along interfaces which are S-shaped in cross-section to form shoulders. The shoulders face radially inward. An annular cavity and a pair of flexible annular lips are formed along the inner diameter portion of the elastomer. A passage extends through the diverter bodies and communicates with the cavity. Hydraulic fluid is pumped through the passages to pressurize the cavities and energize the elastomers, forcing the outer diameter portions of the elastomers outward to seal against the bore.

10 Claims, 2 Drawing Sheets

DIVERTER FLOW LINE SEAL

This application is a continuation of application s.n. 08/898,948, filed Jul. 23, 1997, entitled Diverter Flow Line Seal, and issued on Apr. 6, 1999 as U.S. Pat. No. 5,890,535.

TECHNICAL FIELD

This invention relates in general to diverters and in particular to a diverter flowline seal.

BACKGROUND ART

Diverters are mounted to offshore drilling rigs below the rig floor for use in early stages of drilling. A support housing mounts below the rig floor and has a lateral flowline outlet for directing mud flow when the diverter is closed. The housing is a tubular member with an axial bore. A diverter body is secured to the upper end of a riser, is lowered through the rotary table and lands in the housing. The diverter body has lateral flow openings that are axially aligned with the lateral flowline outlet. A pair of seals are located above and below the lateral flowline outlet.

The seals seal the diverter body to the diverter housing. One type of prior art seal comprises a bulk seal having cylindrical inner and outer diameter walls. The bulk seal is bonded to upper and lower metal rings. After the diverter body lands, hydraulic pressure is applied to the inner diameter of each of the seals to deform the elastomer into sealing engagement with the diverter housing. While workable, improvements are desired.

DISCLOSURE OF INVENTION

A diverter body having an upper portion, a central portion and a lower portion is secured to the upper end of a riser, lowered through the rotary table and landed in a diverter housing. The central portion has lateral flow openings that axially align with a lateral flowline outlet in the housing. A pair of identical gallery seals locate above and below the lateral flowline outlet.

The upper gallery seal is located between the upper portion, the central portion and the housing. The upper gallery seal has upper and lower metal rings and a central elastomer sandwiched therebetween. An inner diameter of the elastomer seals against the central body, and an outer diameter of the elastomer seals against the housing bore. The metal rings are symmetrical and are bonded to the elastomer along interfaces which are S-shaped in cross-section to form shoulders. The shoulders face generally radially inward. The outer diameter portions of the rings have greater axial dimensions than their corresponding inner diameter portions.

An annular cavity and a pair of flexible annular lips are formed along the inner diameter portion of the elastomer. A hydraulic passage extends through the upper portion and the central portion, and communicates with the cavity. After installation, the lips deform and seal against the central portion. After the diverter body lands in the housing, hydraulic fluid is pumped through the passages to pressurize the cavities and energize the elastomers, forcing the outer diameter portions of the elastomers outward to seal against the housing bore. The seals prevent flowing mud from escaping between the diverter and the housing.

BEST MODE FOR CARRYING OUT THE INVENTION

Figure 1:
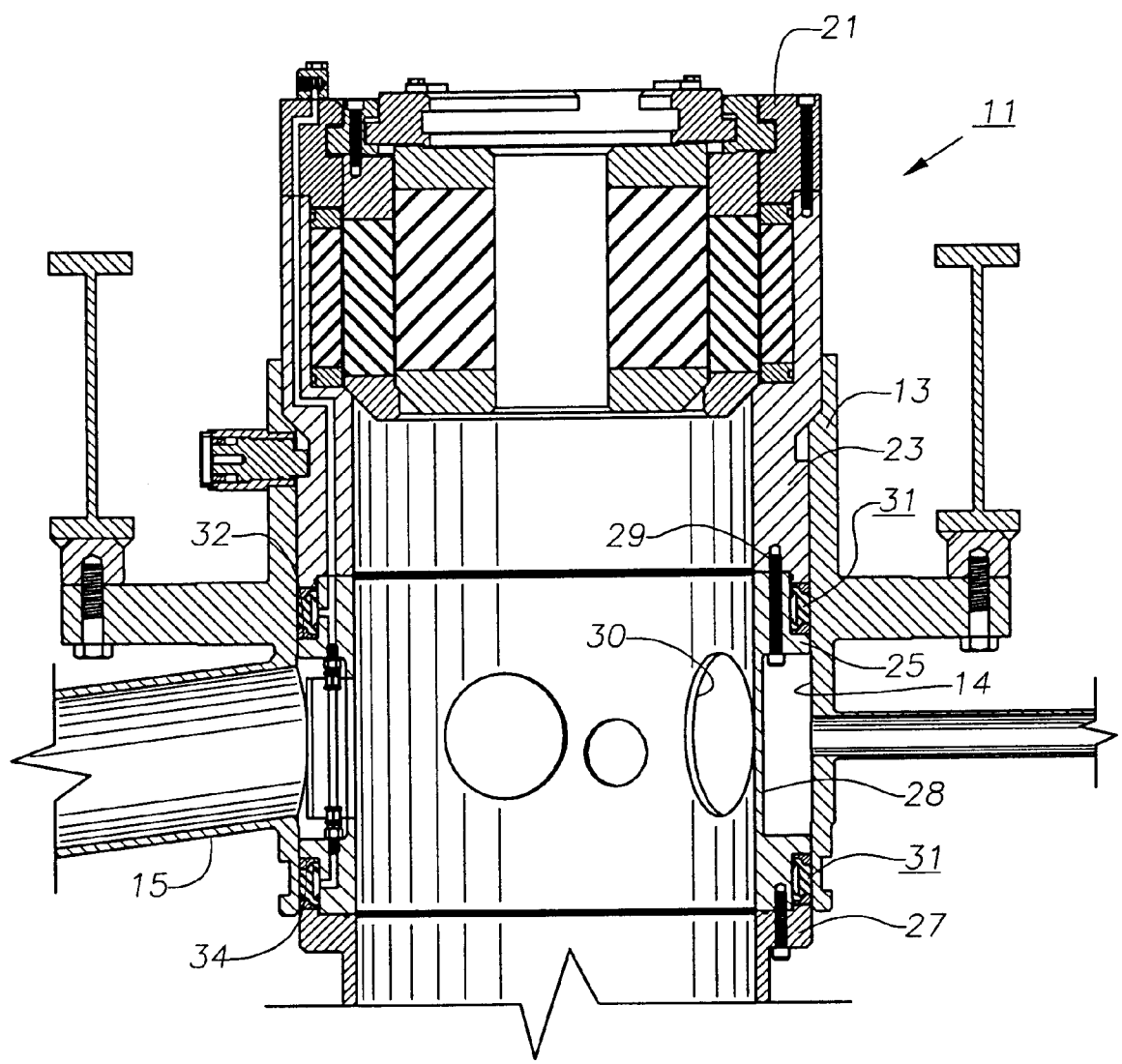
FIG. 1 is a sectional view of a diverter having flow line seals constructed in accordance with the invention.

Referring to FIG. 1, a low pressure blowout preventer or diverter 11 is mounted to a drilling rig below the rig floor. Diverter 11 includes a support housing 13 mounted to the rig floor. Support housing 13 has a lateral flowline outlet 15 for directing mud flow when diverter 11 is closed. Housing 13 is a tubular member having an axial bore 14. A diverter body 21 is secured to the upper end of a riser and lands in housing 13. Diverter body 21 has an upper portion 23, a central portion 25 and a lower portion 27, which are secured to one another with bolts 29. Central portion 25 has lateral flow openings 30 that are axially aligned with lateral flowline outlet 15. A circumferential recess 28 is located on the outer diameter of body 25 to communicate the flow from openings 30 to outlets 15.

Figure 2:
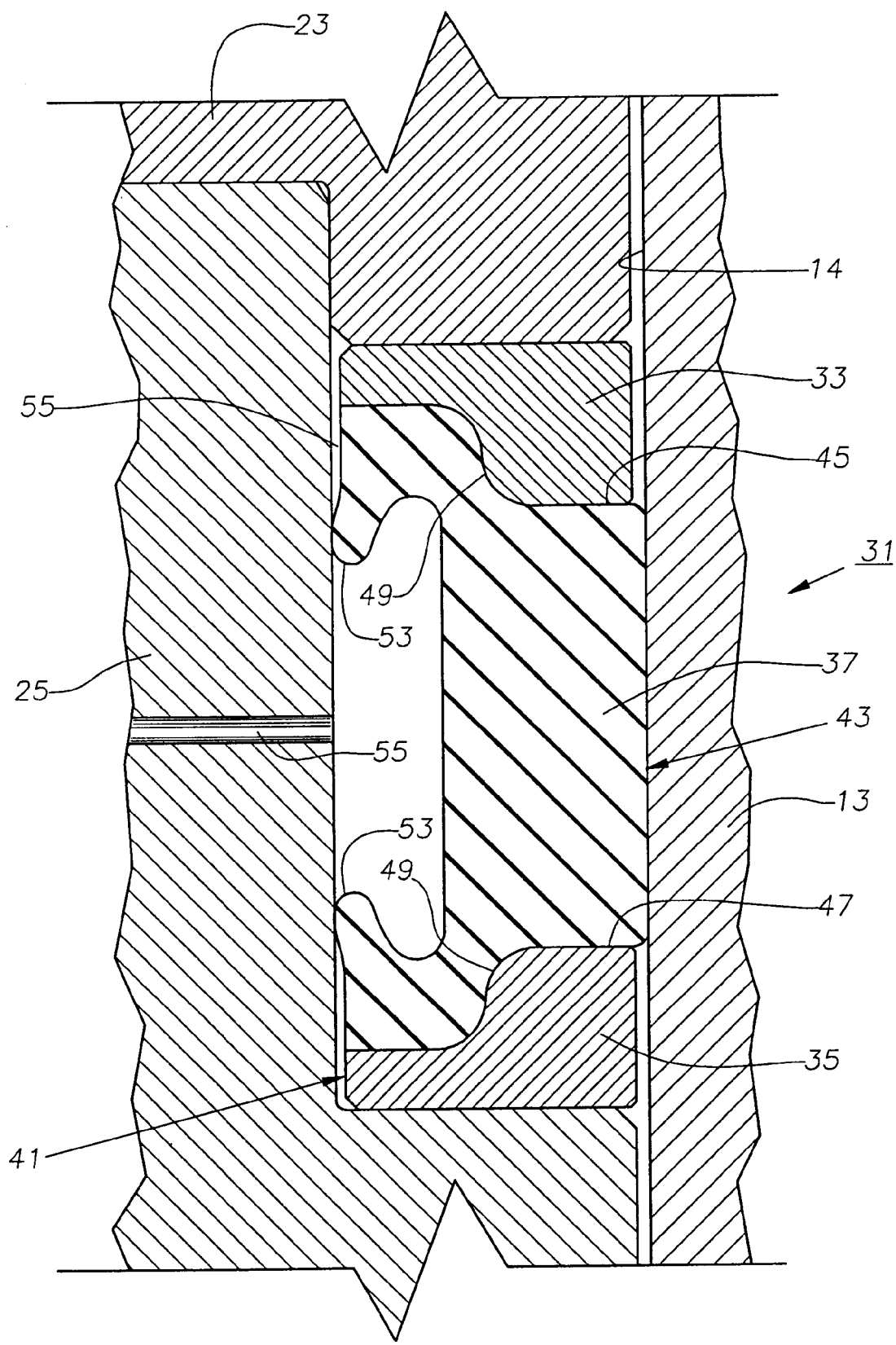
FIG. 2 is an enlarged, partial sectional view of one of the flow line seals of the diverter of FIG. 1.

A pair of identical gallery seals 31 locate above and below lateral flowline outlet 15 in rectangular annular recesses 32, 34. Upper gallery seal 31 is located between upper portion 23, central portion 25 and housing 13. Lower gallery seal 31 is located between lower portion 27, central portion 25 and housing 13. Referring to FIG. 2, upper gallery seal 31 comprises upper and lower metal rings 33, 35, and a central elastomer 37 sandwiched therebetween. Inner diameter 41 seals against central body 25, and outer diameter 43 of seal 31 seals against housing bore 14. Rings 33, 35 are symmetric and may be directly bonded to elastomer 37 along nonrectilinear interfaces 45, 47, respectively. In the preferred embodiment, nonrectilinear interfaces 45, 47 are S-shaped in cross-section to form shoulders 49 with rounded corners. Shoulders 49 face radially inward. The outer diameter portions 43 of rings 33, 35 have greater axial dimensions than their corresponding inner diameter portions 41. Conversely, the inner diameter portion 41 of elastomer 37 has a greater axial dimension than its outer diameter portion 43. The outer diameter portions 43 of upper and central a diverter bodies 23, 25, elastomer 37, and rings 33, 35 are closely spaced to bore 14 of housing 13. When initially installed, these elements are flush with one another.

An annular cavity 51 and a pair of flexible annular lips 53 are formed along the inner diameter portion 41 of elastomer 37. A hydraulic passage 55 extends through upper portion 23 and central body 25, and communicates with cavity 51. Lips 53 protrude axially toward one another and abut the outer surface of central portion 25 along their inner sides. Lips 53 also protrude radially inward to a diameter that is less than an outer diameter of body 25 prior to installation. A small annulus 55 surrounds each lip 53. After installation, lips 53 deform and seal against body 25.

In operation, seals 31 are installed in diverter 11 with lips 53 sealing against body 25. Prior to installation, seal 31, which includes elastomer 37 and rings 33, 35, has an undeformed height or axial dimension that is greater than its deformed axial dimension. In addition, the undeformed outer diameter of elastomer 37 is flush with rings 33, 35. A clearance of up to one quarter inch may extend between the outer diameter of elastomer 37 and housing bore 14. Diverter 11 is landed within housing 13 on a conduit (not shown). When seal 31 is deformed, elastomer 37 is vertically compressed between rings 33, 35 so that its outer diameter is squeezed outward to seal against bore 14 in the clearance. Hydraulic fluid is then pumped through passages 55 to pressurize cavities 51 and energize elastomer 37. Tensile shear stresses created by the initial compression of elastomer 37 are reduced when it is energized by the hydraulic fluid. Because lips 53 seal against body 25, increased hydraulic fluid pressure in cavity 51 causes the outer diameter portions 43 of elastomer 37 to be forced outward to seal against bore 14 of body 13. Hydraulic fluid pressure is maintained during use. Seals 31 prevent the flowing mud from escaping between diverter 11 and housing 13.

The invention has several advantages. The lips provide a pressure seal to create an integral cavity for hydraulic fluid pressure. The lips eliminate a need for creating a hydraulic fluid pressure cavity with secondary seals such as O-rings. The S-shaped interfaces allow simultaneous energization of the lips and the elastomer against the body. Integration of the inner and outer diameter seals eliminates the need to establish a sealed bond along the S-shaped interfaces.

While the invention has been shown in only one of its forms, it should be apparent to those skilled in the art that it is not so limited, but is susceptible to various changes without departing from the scope of the invention.

We claim:

1. In a diverter having a housing with bore and a lateral flow outlet, a body received in the bore, the body having an axial passage and a lateral flow outlet extending from the axial passage through the body to the lateral flow outlet in the housing, an annular upper seal located above the lateral flow outlets, an annular lower seal located below the lateral flow outlets, a fluid passage extending through the diverter for supplying fluid to deform the seals into sealing engagement between the body and the housing, each of the seals comprising:

an elastomeric central portion with an inner diameter wall, an outer diameter wall and upper and lower sides, and a cavity in one of the walls sealed from an annular void above each of the seals and an annular void below each of the seals;

a pair of rigid rings having an interface abutting the upper and lower sides of the central portion;

each of the interfaces of the rings having a generally radially-facing shoulder which is matched to a mating shoulder on the central portion; and wherein each central portion further comprises a pair of lips protruding from one of the diameter walls, the pair of lips being axially spaced apart to seal the cavity for receiving the fluid, each of the lips having a portion which protrudes radially past the metal rings.

2. The diverter of claim 1 wherein each interface of each of the rings extends substantially from the inner diameter wall to the outer diameter wall of the central portion; and wherein:

each interface of each of the rings is bonded to one of the central portions and wherein the lips are more closely spaced to each other than the interfaces on the inner diameter to prevent fluid under pressure from reaching the interfaces.

3. A diverter, comprising in combination:

a housing having a bore and a lateral flow outlet;

a body received in the bore and having an axial passage and a lateral flow outlet extending from the axial passage to the lateral flow outlet in the housing;

an upper elastomer located above the lateral flow outlets;

a lower elastomer located below the lateral flow outlets;

each of the elastomers having an inner diameter wall with a cavity formed therein;

a fluid passage extending through the diverter for supplying fluid to the cavity on said inner diameter wall of each of the elastomers to deform the elastomers into sealing engagement between the body and the housing such that the cavity is sealed from a void above each of the elastomers and a void below each of the elastomers;

a pair of sealing lips protruding from each of the elastomers at upper and lower edges of the cavities;

a pair of rigid rings having an interface abutting upper and lower sides of each elastomer; and each of the interfaces of the rings having a generally radially inward-facing shoulder which is matched to a mating shoulder on each elastomer.

4. The diverter of claim 3 wherein the sealing lips protrude radially inward past inner diameters of the rigid rings.

5. The diverter of claim 3 wherein the lips protrude toward one another.

6. The diverter of claim 3 wherein the axial dimension of each of the elastomers is greater at its inner diameter than at its outer diameter.

7. A diverter, comprising in combination:

a housing having a bore and a lateral flow outlet;

a body received in the bore and having an axial passage and a lateral flow outlet extending from the axial passage to the lateral flow outlet in the housing;

an upper elastomer located above the lateral flow outlets;

a lower elastomer located below the lateral flow outlets;

each of the elastomers having an inner diameter wall with a cavity formed therein;

a fluid passage extending through the diverter for supplying fluid to the cavity on said inner diameter wall of each of the elastomers to deform the elastomers into sealing engagement between the body and the housing such that the cavity is sealed from a void above each of the elastomers and a void below each of the elastomers;

a pair of sealing lips protruding from each of the elastomers at upper and lower edges of the cavities;

a pair of rigid rings having an interface abutting upper and lower sides of each elastomer;

each of the interfaces of the rings having a generally radially inward-facing shoulder which is matched to a mating shoulder on each elastomer wherein each rigid support shoulder is a portion of a rigid ring; and wherein each elastomer is bonded to its respective ring.

8. A seal for locating between inner and outer members and having an axis, comprising:

a pair of rigid rings, each having an inner diameter;

a central elastomer located between the rigid rings, the elastomer having an inner and an outer sidewall and a pair of generally radially outward-facing shoulder interfaces;

each of the rings having a generally radially inward-facing shoulder interface which is mated to one of the shoulder interfaces on the central elastomer; and the elastomer having a pair of axially spaced-apart lips protruding towards each other from the inner sidewall and extending beyond the inner diameter of the rigid rings for sealing engagement with the inner member, the lips defining a cavity for receiving fluid pressure to force the outer sidewall into engagement with the outer member, the elastomer being free of any passages to the cavity other than between the lips.

9. The seal of claim 8 wherein the axial distance between the rings at said inner sidewall of the elastomer is greater than the axial distance between the rings at said outer sidewall.

10. The seal of claim 8 wherein the shoulder interface of each of the rings is beveled to the shoulder interface of the elastomer.

* * * * *